Oct. 30, 1962 R. L. GEYER 3,061,813
FILTERING AND DISPLAY OF SEISMIC SIGNALS
Filed Oct. 5, 1960 3 Sheets-Sheet 1

INVENTOR:
ROBERT L. GEYER
BY Newell Pottoy
ATTORNEY

Oct. 30, 1962 R. L. GEYER 3,061,813
FILTERING AND DISPLAY OF SEISMIC SIGNALS
Filed Oct. 5, 1960 3 Sheets-Sheet 2

INVENTOR:
ROBERT L. GEYER
BY
ATTORNEY

Oct. 30, 1962   R. L. GEYER   3,061,813
FILTERING AND DISPLAY OF SEISMIC SIGNALS
Filed Oct. 5, 1960   3 Sheets-Sheet 3

*INVENTOR:*
ROBERT L. GEYER
BY *Newell Pottoy*
*ATTORNEY*

United States Patent Office 3,061,813
Patented Oct. 30, 1962

3,061,813
FILTERING AND DISPLAY OF SEISMIC SIGNALS
Robert L. Geyer, Tulsa, Okla., assignor to Pan American Petroleum Corporation, Tulsa, Okla., a corporation of Delaware
Filed Oct. 5, 1960, Ser. No. 60,749
3 Claims. (Cl. 340—15.5)

This invention relates to seismic geophysical surveying and is directed particularly to the filtering of the seismic signals. More specifically, it is directed to a seismic filtering and display system which substantially eliminates phase distortion of the signals and which provides additional aids to the picking of reflections and the interpretation of the records.

This application is a continuation-in-part of my application Serial No. 631,817 filed December 31, 1956, and now abandoned.

In seismic geophysical surveying it has long been recognized that passing the detected signals through filters is often effective in increasing the signal-to-noise ratio of the reflections. This is particularly true where the frequency spectrum of the reflection signals occupies a relatively narrow frequency band, or where the noise and the signals occupy different frequency bands. No single filter, however, is optimum for all reflection signals or even for a given reflection over a large prospecting area. It has thus become customary to provide a variety of filters in seismic recording or playback systems, with the choice of a filter or filters being made most often on an empirical basis.

Even when they effectively reduce the noise amplitude relative to the signal, filters almost inevitably produce some delay and distortion of the signal itself. This is particularly true if the phase shift of a filter is a nonlinear function of frequency in the band of frequencies passed, or if the zero-frequency intercept of the phase-frequency curve has an improper value. Restricting the choice of filters to those with linear phase curves of proper zero-frequency intercept, to avoid phase distortion and varying delay, severely limits the number of possible filters available for use. Even then, different acceptable filters will ordinarily produce different time delays of a given reflection signal, so that direct comparison of reflection times for different filters is difficult. Furthermore, the frequency band width of linear phase shift filters may be narrower than would otherwise be desirable.

Another effect of filters, which is undesirable but is tolerated in order to improve the overall signal-to-noise ratio in other respects, is their tendency to add "tails" or extra oscillations to the seismic impulses. Thus, a simple impulse, which might be thought of as a single "spike" or "block" waveform and should be represented as a single departure and return of a trace to zero, will generally be altered by the filter to at least two and sometimes more trace excursions and returns. Different filters may vary widely in the way they alter the received seismic impulses. This property is frequently termed the "unit-impulse response."

It is accordingly a primary object of my invention to provide a novel and improved method and apparatus for filtering signals such as seismic signals, substantially without time delays, phase distortion, or limitation as to frequency band width. Another object is to provide a novel and improved seismic signal display system utilizing such a distortion-free filtering system to aid the interpretation of seismic signals in various ways, such as by combining or by directly comparing the outputs of different filters. Still another object is to provide a novel and improved seismic filtering and display system having a simpler unit-impulse response than any single filter, so as to reduce or minimize the adding of "tails" or extra oscillations to the seismic impulses. A still further object is to provide a novel and improved filtering and display system which will assist in determining uniquely the center picks of reflection wavelets and in separating individual wavelets which interfere as the reflection horizons corresponding thereto converge. Still other and further objects, uses, and advantages of the invention will become apparent as the description proceeds.

Stated briefly, I have observed that, regardless of the phase-shift characteristics of a filter, it may be employed in combination with what is termed a "forward-reverse" playback system, with the result that the envelope delay of any seismic wavelet is reduced very nearly to zero. This means that the center of the wavelet may be picked to give the same reflection travel time for all filters. If it is desired to combine the outputs of two or more filters, the centers of the wavelets will add in phase, while preceding and following "legs" or half-waves will in some degree cancel themselves out. Thus, the tendency of any single filter to add "legs" or "tails" is reduced or minimized. Or, if the outputs of two or more filters are recorded separately but superimposed or placed close side by side, the wavelet centers can be identified by in-phase line ups—that is, the alignment in time of like parts of the wavelets, usually of troughs or peaks—the effect of different filters on the character of a reflection can be readily evaluated, and insight is provided as to the nature of the reflecting interface, whether it is a positive or negative acoustic impedance contrast.

More specifically, my invention comprises passing the electric waves, corresponding to the received seismic waves which are to be recorded as a single trace of a seismogram, through a filter and making a reproducible recording of these waves. This recording is then reproduced by scanning or passing it past or through a transducing element in a direction opposite to that in which it was recorded. The reproduced "reversed" electric waves are again passed through the same filter. Upon repeating all of these steps for one or more additional, different filters, the resultant filter outputs, which are preferably of similar but not necessarily exactly equal amplitudes, are recorded either as separate, juxtaposed, or superimposed traces, or as combined into a single average or addition trace. The final recorded trace or traces are preferably in a form suitable for visual inspection or interpretation, such as oscillographic, variable-density, or variable-area; and they are placed on the final record-receiving medium in a "normal" time sequence of events in which time proceeds from left to right. In some instances this may require reversing the normal movement of the recording medium or some other appropriate operation.

This will be better understood by reference to the drawings forming a part of this application and illustrating typical embodiments of the invention and modifications thereof. In these drawings, FIGURES 1 and 2 are block diagrammatic illustrations of an embodiment of the invention during two phases of its operation;

Figure 1:
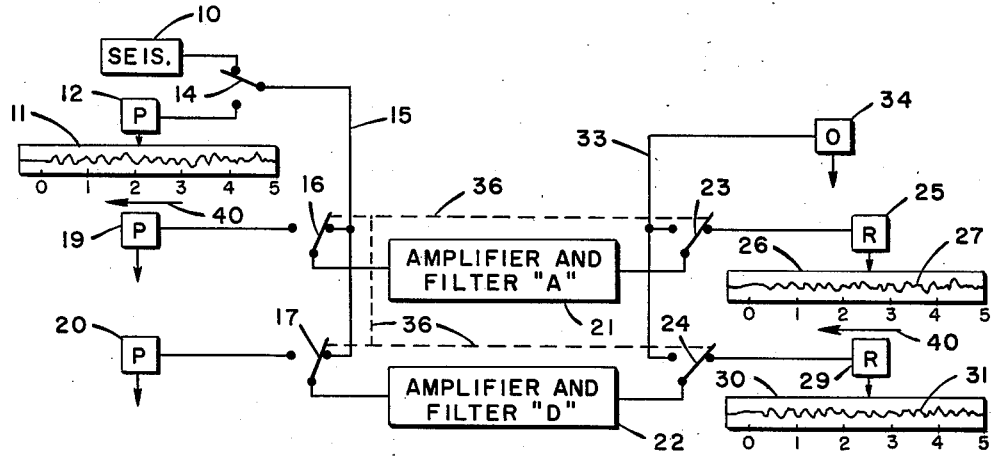
Figure 2:
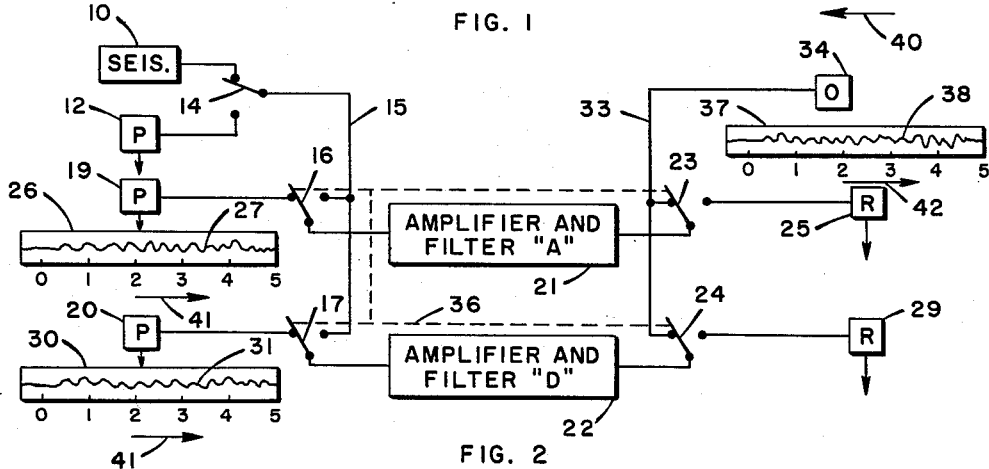

Referring to these drawings in detail and particularly to FIGURES 1 and 2, these two figures illustrate one embodiment of the invention as it applies to a single seismogram trace using two filters of different characteristics. It will be immediately apparent how these block diagrams may be expanded to accommodate any number of multiple traces and any number of different filters.

The source of signals to be recorded as a single seismogram trace may be either a seismometer or a seismometer group 10 forming part of a conventional seismometer spread covering an interval of the ground surface, or it may be a phonographically reproducible recording 11 of such a seismometer or seismometer group previously made with minimum filtering and adapted to be reproduced as a corresponding electric signal by a playback unit 12. By the term "phonographically reproducible" is meant any type of trace capable of conveniently being reproduced by a pick-up unit as a corresponding electric wave and may be, for example, a magnetic trace on a magnetic tape, disk, by wire reproducible by a magnetic pick-up head, or a variable-density or variable-area trace on photographic film reproducible by photo-cell scanning. The showing of seismometer 10 and of recording 11 and reproducer 12 is to illustrate the fact that either may be the source of input signal for the invention, not that the output of seismometer 10 is recorded as trace 11 during operation of the invention.

By means of a double-throw selector switch 14, either the seismometer unit 10 or the playback unit 12 can be connected to a signal input lead 15 which extends to one fixed terminal of each of two double-throw selector switches 16 and 17. The other fixed terminals of these switches are respectively connected to reproducer or playback units 19 and 20, the use of which is more fully described in connection with FIGURE 2. The movable arm of switch 16 is connected to the input of an amplifying and filtering channel 21 having a filter characteristic A, while the arm of switch 17 is similarly connected to a second amplifier and filter channel 22 having a substantially different filter characteristic D. The channels 21 and 22 need not have any special characteristics but may be any conventional units used in recording seismic signals and may include automatic volume-control features and the like. The filters having characteristics A and D may have any desired frequency-response characteristics, and it is not necessary that their phase characteristics be linear or have any particular zero-frequency intercept.

Since in every case an average or combination result is desired which does not unduly emphasize the effect of any single filter, it is to be understood that the amplifier gains, including the automatic volume control actions, should be similar in the different filter channels, so as to produce similar final amplitudes. It is not necessary that the different filter outputs be exactly equal in amplitude, however, as it may be found by inspection of the resultant trace that minor deviations from equality, purposely introduced by adjustment of the various channel gains differently, may improve the cancellation of the extra legs introduced by the individual filters.

The output leads of channels 21 and 22 are respectively connected to the movable arms of double-throw selector switches 23 and 24. One fixed terminal of the switch 23 is connected to a recording head or unit 25 adapted to make on a record medium 26 a phonographically reproducible trace 27 corresponding to the output of channel 21, while the corresponding fixed terminal of switch 24 is connected to a similar recording unit 29 adapted to produce on the record medium 30 a phonographically reproducible trace 31 corresponding to the output of channel 22. The other fixed terminals of the switches 23 and 24 are connected in parallel by a lead 33 to an oscillographic recording unit 34 such as a galvanometer of a galvanometer camera unit used for making conventional photographic seismic oscillographic recordings. As appears in FIGURE 2, the unit 34 is adapted to produce on a record medium 37, such as photosensitive paper or film, an oscillographic trace 38 which is the resultant or average of the outputs of channels 21 and 22. For convenience if desired, the switches 16, 17, 23, and 24 may be mechanically coupled as indicated by dotted lines 36 for simultaneous operation.

The operation of this embodiment of the invention may be considered in two phases, respectively illustrated by FIGURES 1 and 2. With switches 16, 17, 23, and 24 thrown to the right making the contacts shown in FIGURE 1, the signal from seismometer or seismometer group 10 is simultaneously applied in parallel to the inputs of both channels 21 and 22. The traces 27 and 31 are then recorded with the time sequence of events running from left to right on records 26 and 30, as by moving these records past units 25 and 29 in the direction indicated by arrows 40—i.e., from right to left. This may be termed recording in a "normal" or "forward" sense.

Upon playback as shown in FIGURE 2, switches 16, 17, 23, and 24, are thrown to the left, and the direction of translation of records 26 and 30 past the playback heads 19 and 20 is as shown by arrows 41, reversed with respect to the arrows 40. This may be termed a "reverse" playback, so that the sequence of electrical events in the outputs of the pickup heads 19 and 20 is opposite or reversed relative to the forward or normal time sequence of events in the electrical waves which were passed through channels 21 and 22 in the phase of operation shown in FIGURE 1. These reversed signals or waves are passed through the channels 21 and 22 a second time, are combined on the lead 33, and are recorded by the unit 34 as the oscillographic trace 38 representing the instantaneous average values of the two channel filter outputs. The operation shown in FIGURE 2 may thus be considered recording in an inverted or reverse sense.

In order for the trace 38 to have a "normal" appearance such that the sequence of events in time runs from left to right, it is necessary also to move the record medium 37 past the unit 34 in a direction opposite to the usual one—i.e., from left to right as indicated by arrow 42. This corrects for the reversal of the traces 27 and 31 in the playback by the units 19 and 20.

It is essential that the once-filtered output of channel 21 and filter A, recorded as the trace 27, be reproduced in reverse by the unit 19 feeding channel 21 and filter A, instead of by the unit 20 connected to channel 22, as it is the double passage of the trace signal through the same filter—once forward and once in reverse—which cancels out the filter phase shift occurring in any single passage. Incidentally, any phase shifts occurring elsewhere in the channel than in the filter are similarly cancelled out. Obviously, if desired for any purpose such as obtaining a sharper filter cut-off, the above two-step filtering process of forward and reverse playback can be repeated any desired number of times. As long as there are an equal number of forward and reverse playbacks, all phase shifts and delays are substantially cancelled out.

This means also that, if the source of signals is the pick-up unit 12 scanning a substantially unfiltered, reproducible record 11, it is immaterial whether the signals are first translated in a forward sense by passing record 11 from right to left past unit 12 as shown by the arrow 40, or in a reverse sense by the opposite movement. The point of major importance is that the intermediate record 26 (or 30) should be translated by the pick-up 19 (or 20) in whatever direction or sense is opposite to that in which it was recorded by unit 25 (or 29). It is also important that the final record 37 should present the data with a normal time sequence of events running from left to right, and it will be apparent how the direction of translation of the record 37 should be managed to accomplish this.

Likewise, it will be apparent that a single amplifier channel with an adjustable filter can be used in sequence in place of two or more such channels simultaneously, with an intervening change of filter setting. The result of the forward and reverse playbacks through each filter is stored as a reproducible trace until all filters have been used, and the stored traces are then reproduced and cumulated into a single resultant trace for recording as the final oscillographic trace 38.

Figure 3:
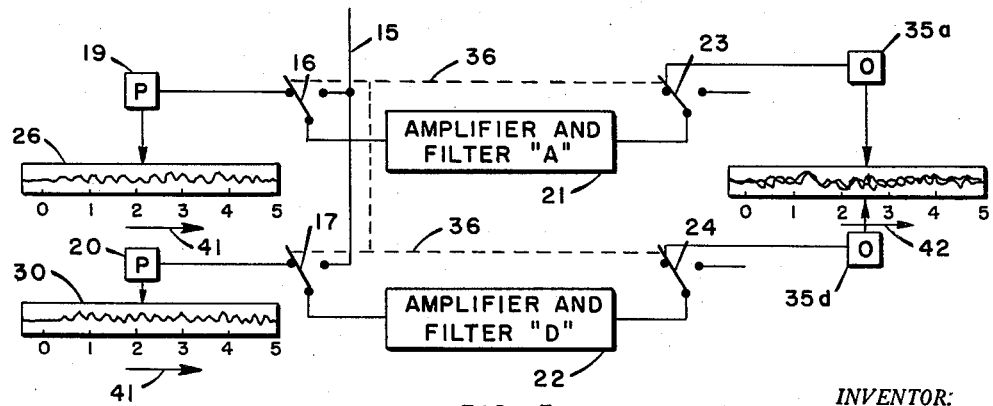
FIGURE 3 is a block diagrammatic illustration of a modification of the invention in operation as shown in FIGURE 2.

An alternative presentation of the results of forward-reverse playback and filtering is illustrated by FIGURE 3. This figure corresponds to FIGURE 2 in that, like FIGURE 2, it shows the reverse playback of the phonographically reproducible records 26 and 30 made according to FIGURE 1. Instead of averaging the two outputs of the channels 21 and 22 for final recording as in FIGURE 2, by connection in parallel to the lead 33, the left-hand position of output switch 23 connects the output of the channel 21 alone to an oscillographic recording unit 35a, while the switch 24 similarly connects channel 22 separately to a second oscillographic recording unit 35d. The units 35a and 35d are preferably adjusted to record two separate but superimposed traces 38a and 38d, which are preferably coded in some way—for example, in one of the ways described below—so as to be individually recognizable when they diverge. In this way, the exact changes in wave form brought about by changes in filter characteristics can be immediately seen, and there are other benefits as will be demonstrated below.

Figure 4:
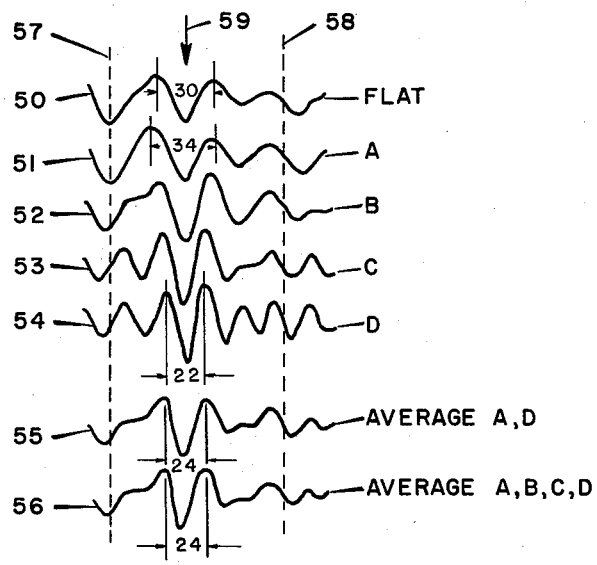
FIGURE 4 shows tracings of an actual seismic wavelet to which the invention has been applied.

In FIGURE 4 are shown tracings of part of a trace from an actual seismic field record to which the invention has been applied. Trace 50 labeled "flat" is a reproduction of the actual field trace as it was recorded substantially without filtering, by an amplifier and recorder having a substantially flat frequency response over a wide range. The traces 51, 52, 53, and 54, respectively labeled A, B, C, and D, are the results of applying the forward-reverse playback procedure of the invention to the trace 50, using four different filters and recording with similar amplitudes. The actual frequency-response curves of these filters are correspondingly labeled A, B, C, and D, in FIGURE 5.

Trace 55 is the resultant or average of traces 51 and 54 made by additively combining as shown in FIGURE 2, using the two filters A and D. Trace 56 is likewise a resultant or averaged trace like 55, but is the average of all of the similar-amplitude traces representing all four of the filters A, B, C, and D. The spacing of the vertical lines 57 and 58 in FIGURE 4 represents 100 milliseconds of record time. In spite of the wide differences in frequency response of the various filters shown in FIGURE 5, the centers of the pulse shown at the time of arrow 59 are within 1 millisecond of each other for all of these filters.

The width of this pulse, as measured by the separation of the peak preceding and the peak following the center trough, is a different matter. From the unfiltered trace 50, this width is about 30 milliseconds. The low-frequency filter A appears to lengthen it to about 34 milliseconds, while the highest-frequency filter D shortens the apparent pulse width to about 22 milliseconds but increases the oscillating character of the preceding and following half-waves or legs. On the averaged trace 55, the pulse width is only about 24 milliseconds, almost as narrow as on trace 54 of filter D—but the oscillatory character of the preceding and following legs of trace 54 is to a substantial degree cancelled out. Thus, if two wavelets should occur in close time sequence, the possibility of separately recognizing them on a trace such as 55 is substantially greater than for any of the other traces 50 through 54.

The same is true of the averaged trace 56, which is very nearly like trace 55 except that the cancellation of leading and trailing legs of the wavelet is perhaps slightly more complete. The ability to separate closely-spaced reflections in this manner, by suppressing added legs due to filtering with finite band widths or to including higher frequencies, is of considerable importance in following two reflections from convergent interfaces as they increasingly interfere.

Figure 5:
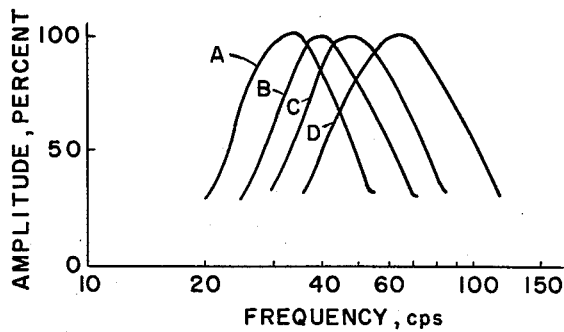
FIGURE 5 shows the filter frequency-response curves applicable to FIGURE 4.
Figure 6:
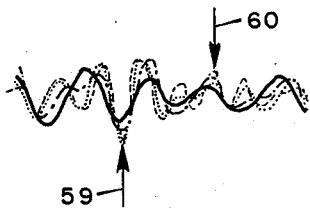
FIGURE 6 shows an alternative mode of presentation of the filtered data of FIGURE 4.

The presentation of FIGURE 6 is an example of the use of the embodiment of the invention shown in FIGURE 3, employing the four filters of FIGURE 5 on trace 50 of FIGURE 4. FIGURE 6 amounts simply to showing the traces 51, 52, 53, and 54, not averaged as in FIGURES 2 and 4, but superimposed and individually identifiable by coding in a suitable manner. Thus, trace 51 is a solid line, trace 52 a dot-dash line, trace 53 a dotted line, and trace 54 is a dashed line.

Such a presentation has a number of distinct advantages. When the filters form a family of adjacent frequency bands which together cover a substantial expanse of the frequency spectrum, this presentation is a very convenient and compact form of frequency analysis. The exact effect of each filter in modifying reflection character is clearly shown. The visible coincidences of like phases of a wavelet, such as the coinciding troughs at arrow 59 or the peaks at arrow 60, strongly suggest picking these points as wavelet centers. If it can be assumed that the trough pick at 59 is a reflection from a single interface corresponding to a positive contrast of acoustic impedance, then the peak pick at 60 corresponds to a negative contrast of acoustic impedance. Thus, some insight is provided into the nature of the reflecting interface, which insight may be extended by a study of amplitudes, if the amplification conditions are sufficiently evaluated or stabilized. As in all seismic interpretation, the validity of the picks at 59 and 60 should of course be tested by looking for evidence of support or lack of support on the neighboring traces.

The manner in which the character of a reflection changes from one filter to the next in a succession of filters as in FIGURE 6—that is, whether the change is systematic and regular, or irregular—may be indicative of the presence or the nature of extraneous noise, which should be guarded against in timing reflections to avoid errors. Anomalous changes of character of a reflection that is otherwise considered as likely to be uniform may also be interpreted as changes in the conditions of seismic-wave initiation or reception. In any event, the utility of such a presentation as that illustrated by FIGURE 6 is greatly increased by eliminating variable time delays and phase distortion of the waves by the use of the forward-reverse playback and filtering process.

As with the averaged-trace presentation of the traces 55 and 56 of FIGURE 4, it is desirable but somewhat less essential than with regard to FIGURE 4 that the different traces, corresponding to different filter outputs of the same input signals, be similar in amplitude in making the presentation of FIGURE 6. By thus making the different filter outputs of similar amplitude, no one filter unduly influences the final trace presentation 55 as to make it more difficult for an interpreter to pick the record times of phase coincidence which suggest wavelet centers.

There are many ways of making an oscillographic record of superimposed, coded traces, like those shown in FIGURE 6. By way of example, one arrangement of apparatus for doing this is shown in somewhat diagrammatic form in FIGURES 7 and 8. These may be regarded respectively as elevation and plan views. To avoid undue complication of the figures, only three traces with four filters, which may be the filters A, B, C, and D of FIGURE 5, are shown, but it will be apparent how to expand the system to accommodate any number of traces and filters.

Figure 7:
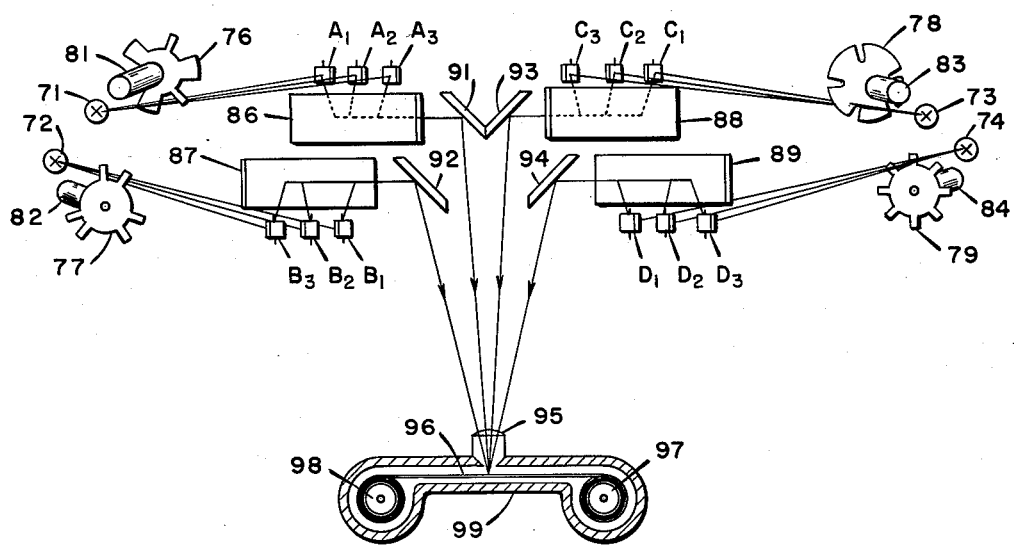
FIGURES 7 and 8 are diagrammatic views, respectively in elevation and plan, of one possible arrangement of apparatus for producing recordings of the type shown in FIGURE 6.
Figure 8:
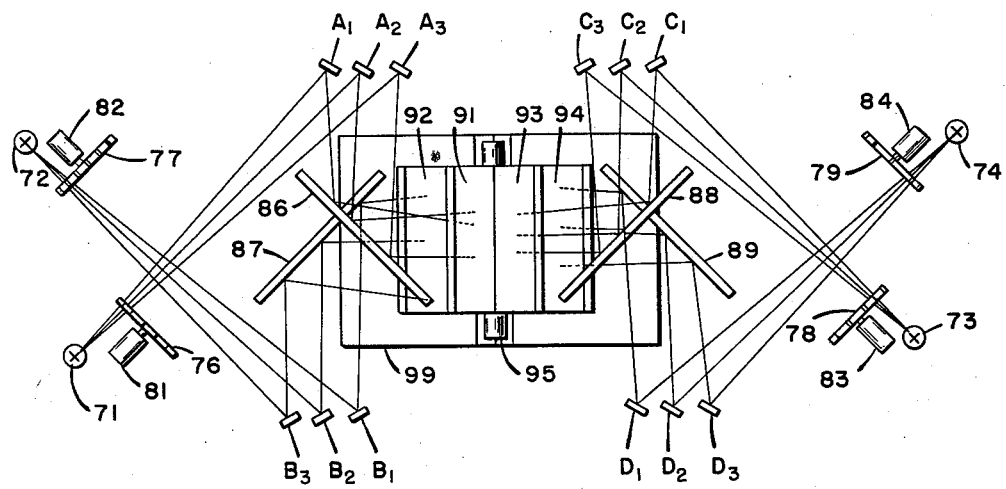

Thus, the signals of traces of 1, 2, and 3 as filtered using filter characteristic A are applied to mirror galvanometers, of which the mirrors are respectively designated $A_1$, $A_2$, and $A_3$. The same three trace signals, as modified by filter B, deflect the mirrors $B_1$, $B_2$, and $B_3$. Similar treatment of the signals for filter C is provided by mirrors $C_1$, $C_2$, and $C_3$, and for filter D by mirrors $D_1$, $D_2$, and $D_3$. Mirrors $A_1$, $A_2$, and $A_3$ are illuminated by a light source 71, $B_1$, $B_2$, and $B_3$ by a source 72, $C_1$, $C_2$, and $C_3$ by a source 73, and $D_1$, $D_2$, and $D_3$ by a source 74. Preferably the light from each source is interrupted according to a different time pattern, as by means of rotatable shutters or masks, cut by various sizes and arrangements of peripheral notches or extensions. Thus, light beams from sources 71 to 74 are respectively interrupted by masks 76, 77, 78, and 79, each different from the others as shown by FIGURE 7, and each rotated by a relatively constant-speed motor 81, 82, 83, or 84. After deflection by the various galvanometers, each of the galvanometer beams from the various sources is deflected through approximately a right angle by one of mirrors 86, 87, 88 and 89, to one of a second set of mirrors 91, 92, 93, and 94, and thence through a cylindrical condensing lens 95 onto a photographic paper or film strip 96 which is drawn from a supply spool 97 to take-up spool 98 in a light-tight housing 99 in the manner conventional in oscillographic recording.

The operation of this arrangement of apparatus is believed obvious from the foregoing description and from what is well-known in the art. It may be pointed out simply that such an arrangement of optical, electrical, and mechanical elements as this has the advantage that the sources of the light beams and their modulation devices may be spaced widely enough apart so that their design and construction are no great problems, while the various beams are directed against the photographic record medium 96 as if they came from a single array of galvanometers within a small space.

Although the most common type of seismic data presentation has been as an oscillographic trace, other types of presentation can be used to advantage with this invention. A particularly useful one is a variable-density type of presentation in which the wave forms are translated into variations of a gray scale between black and white or between opacity and transparency. Thus, the oscillographic recorder unit 34 may be replaced by the recording element of a variable-density camera using photographic film or paper. Such recordings, particularly after corrections for elevation, weathering and move-out are made, are especially useful for displaying seismic data in the form of cross-sections.

An advantage of the presentation in variable-density form is the additional measure of control which is available for emphasizing significant wave troughs, peaks, and the like, in that the photographic film and its processing can be chosen or manipulated to vary or to increase the density contrast. That is to say, significant peaks and troughs can be emphasized by a density contrast which makes them all black or all white and which suppresses or minimizes the intervening grays. When such traces are placed side by side on a cross-sectional display, the possible interpretations of the data in terms of geological structures are rendered much more apparent.

While I have thus described my invention in terms of the foregoing embodiments and modifications thereof, it should be understood that these are for purposes of illustration only. Still further modifications will occur to those skilled in the art. The scope of the invention therefore should not be considered as limited to the details set forth but is properly to be ascertained from the appended claims.

I claim:
1. In seismic-wave recording wherein seismic waves received at a plurality of locations spaced from a shot point are recorded as a corresponding plurality of parallel traces, the steps which comprise, for each trace, translating the seismic waves into corresponding first electric waves, filtering said first electric waves in a plurality of different ways, recording with similar amplitudes each of said differently filtered first electric waves as one of a plurality of photographically reproducible traces on a record-receiving medium, reproducing each of said reproducible traces as one of a plurality of second electric waves in which the sequence of events is reversed relative to the sequence of events in said first electric waves, filtering each of said second electric waves in the same way the corresponding one of said first electric waves was filtered, and separately recording, with similar amplitudes and superimposed on each other, each of said filtered second electric waves as a trace coded to be individually recognizable, whereby wavelet centers can be identified by in-phase lineups of said second filtered electric waves.

2. In seismic-wave recording wherein seismic waves received at a plurality of locations spaced from a shot point are recorded as a corresponding plurality of parallel traces, the steps which comprise, for each trace, translating said seismic waves into corresponding electric waves, passing said electric waves through a first band-pass filter an even number of times, one-half of said times being with said electric waves having a normal sense relative to the sequence of seismic events in time and the other half of said times being with said electric waves having a reverse sense relative to said sequence of seismic events in time, similarly passing said electric waves unmodified by said first filter an even number of times through a second band-pass filter of different frequency response from said first filter, and separately recording said first and second filter final outputs with similar amplitudes, superimposed on each other and coded to be individually recognizable, whereby wavelet centers can be identified by in-phase lineups of said outputs.

3. In seismic-wave recording wherein seismic waves received a plurality of locations spaced from a shot point are recorded as a plurality of parallel traces, the steps which comprise translating the substantially unfiltered seismic waves corresponding to each trace into first electric waves of corresponding wave form with the events therein occurring in a given sense relative to the sequence of seismic events in time, passing said first electric waves through a plurality of band-pass filters in parallel channels and covering a plurality of adjacent frequency bands, recording with similar amplitudes as a plurality of phonographically reproducible traces the outputs of said filters, translating said reproducible traces into a corresponding plurality of second electric waves with the events therein occurring in the sense opposite to said given sense, passing each of said second electric waves through the one of said filters from which it was derived, and separately recording said filtered second electric waves with similar amplitudes, superimposed on each other and coded to be individually recognizable, whereby wavelet centers can be identified by in-phase lineups of said second filtered electric waves.

References Cited in the file of this patent
UNITED STATES PATENTS 2,657,276    Eliot _____ Oct. 27, 1953
2,757,357    Peterson _____ July 31, 1956

UNITED STATES PATENT OFFICE

CERTIFICATE OF CORRECTION

Patent No. 3,061,813                            October 30, 1962

Robert L. Geyer

It is hereby certified that error appears in the above numbered patent requiring correction and that the said Letters Patent should read as corrected below.

Column 8, line 10, for "photographically" read -- phonographically --.

Signed and sealed this 11th day of June 1963.

(SEAL)
Attest:

ERNEST W. SWIDER
Attesting Officer

DAVID L. LADD
Commissioner of Patents